Patented June 25, 1929.

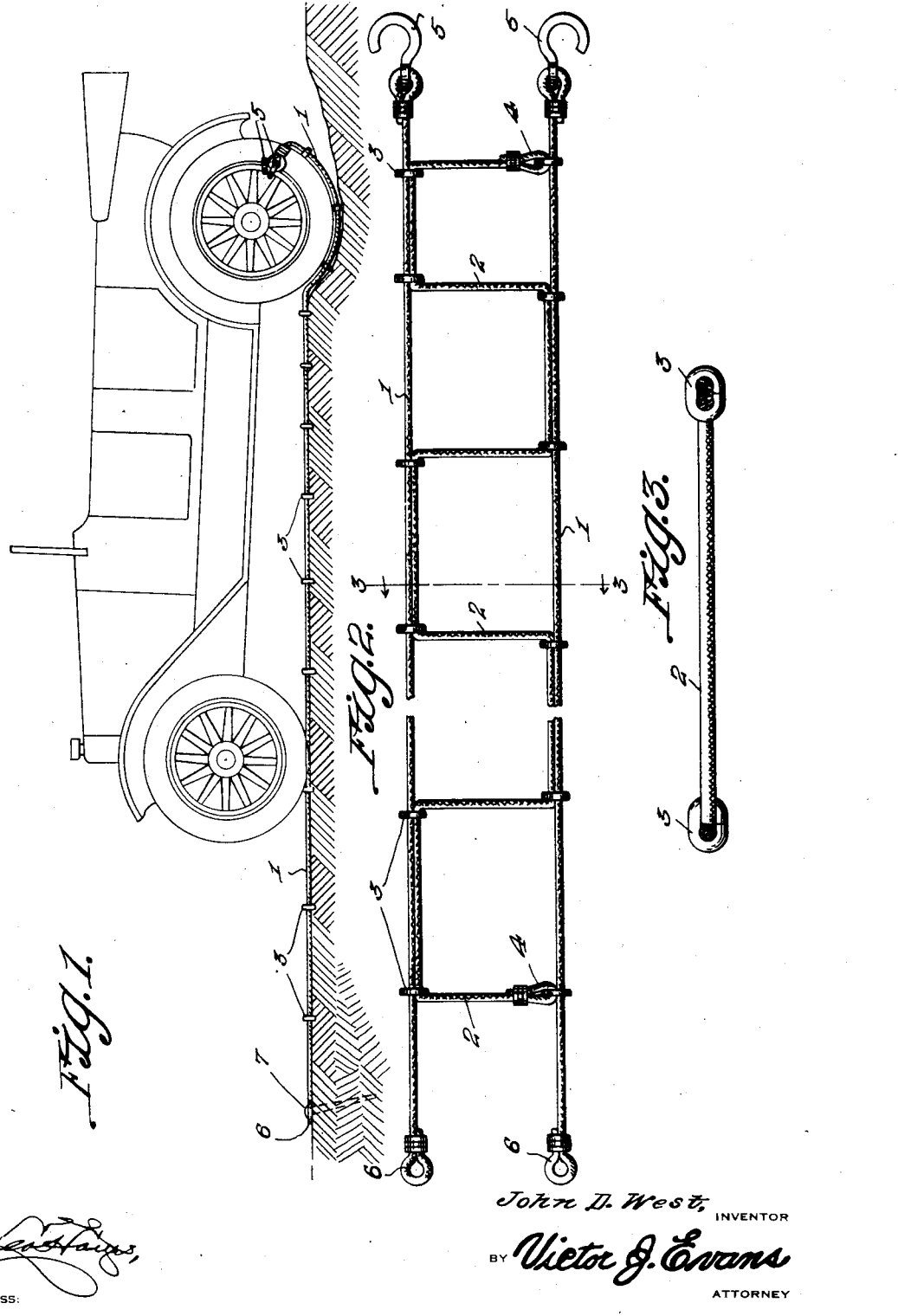

1,718,509

UNITED STATES PATENT OFFICE.

JOHN D. WEST, OF MODALE, IOWA.

EXTRICATING DEVICE FOR MOTOR VEHICLES.

Application filed March 14, 1928. Serial No. 261,551.

This invention relates to a device for enabling motor vehicles and the like to extricate themselves from mud-holes or soft ground, the general object of the invention being to provide a pair of parallel flexible members connected together by cross pieces, with means for attaching one end of the device to a wheel of the vehicle, with eyes at the other end of the device for engaging pegs driven into the ground a distance from the vehicle so that when the wheel begins to revolve, a pull will be exerted on the device as it is being wrapped around the wheel, thus causing the vehicle to move out of the hole, the eyes leaving the pegs when the wheel to which the device is attached reaches the pegs.

Another object of the invention is to make the cross pieces from a flexible member which is passed back and forth between the parallel members, with portions of the third member attached to the parallel members.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the device in use.

Figure 2 is a plan view of the device.

Figure 3 is a section on line 3—3 of Figure 2.

As shown in these views, the device comprises a pair of side members 1 and a third member 2, these members being formed of rope or chains and the member 2 has its ends attached to one of the members 1 adjacent the ends thereof and then the member 2 is carried back and forth between the two members 1, with the portions contacting with the members 1 fastened thereto by the clips 3, the ends of the member 2 being fastened to one of the members 1 by means shown at 4. As will be seen, the device is in the shape of a ladder, with portions of the member 2 extending parallel to and contacting with parts of the members 1. Thus the device has considerable strength, as portions of the members 1 are reinforced by the members 2. A hook 5 is attached to one end of each of the members 1 and an eye 6 is formed at the other end of each member.

The hooks are adapted to be fastened to one of the rear wheels of the vehicle by having the hooks engaging the spokes thereof or the felly thereof, or these hooks can engage a non-skid chain placed on the wheel.

Pegs 7 are driven into the ground a distance from the vehicle, either in front or in the rear of the vehicle and the eyes 6 are placed over these pegs. Thus when the wheel starts to rotate, it will tend to wrap the device on the wheel so that a pull is exerted upon the device, which will cause the vehicle to move itself out of the mudhole or other soft place in the road surface. As the wheel passes over that part of the device which engages the pegs, the eyes will automatically leave the pegs so that it is not necessary to unfasten the device from the pegs. When the device wraps itself around the wheel, it will act as a non-skid and non-slip device.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:

A device of the class described comprising a pair of flexible side members, a third flexible member having its ends attached to one of the side members, said member being passed back and forth between the members with portions thereof attached to the side members to form cross pieces between the side members, the portions between the cross pieces extending parallel to the side members and being connected at their ends with the side members, a hook on one end of each side member and an eye on the other end of each side member.

In testimony whereof I affix my signature.

JOHN D. WEST.